United States Patent
Chen et al.

(10) Patent No.: US 6,945,710 B2
(45) Date of Patent: Sep. 20, 2005

(54) OPTICAL SUB-ASSEMBLY MODULE FOR SUPPRESSING OPTICAL BACK-REFLECTION AND EFFECTIVELY GUIDING LIGHT FROM LIGHT SOURCE TO OPTICAL WAVEGUIDE

(76) Inventors: Wen-Tzung Chen, 235 Chung-Ho Box 8-24, Taipei (TW); Chien-Cheng Yang, 235 Chung-Ho Box 8-24, Taipei (TW); Chun-Chieh Chang, 235 Chung-Ho Box 8-24, Taipei (TW); Chun-Te Lee, 235 Chung-Ho Box 8-24, Taipei (TW); Chih-Hsien Chang, 235 Chung-Ho Box 8-24, Taipei (TW); Cheng-Ta Chen, 235 Chung-Ho Box 8-24, Taipei (TW); Bao-Jen Pong, 235 Chung-Ho Box 8-24, Taipei (TW)

( * ) Notice: Subject to any disclaimer, the term of this patent is extended or adjusted under 35 U.S.C. 154(b) by 275 days.

(21) Appl. No.: 10/341,477

(22) Filed: Jan. 10, 2003

(65) Prior Publication Data

US 2004/0136650 A1 Jul. 15, 2004

(51) Int. Cl.[7] .................................................. G02B 6/26
(52) U.S. Cl. .............................. 385/93; 385/92; 385/88; 385/31; 385/33
(58) Field of Search ............................. 385/31, 33, 34, 385/88, 92, 93, 94, 38, 39

(56) References Cited

U.S. PATENT DOCUMENTS

| | | | | |
|---|---|---|---|---|
| 4,966,444 A | * | 10/1990 | Droegemueller et al. | ... 359/641 |
| 5,552,918 A | * | 9/1996 | Krug et al. | ................. 398/139 |
| 6,621,067 B2 | * | 9/2003 | He et al. | ..................... 250/225 |
| 6,748,137 B2 | * | 6/2004 | Wolak et al. | ................. 385/33 |
| 2003/0138210 A1 | * | 7/2003 | Steinberg et al. | ............. 385/38 |

* cited by examiner

Primary Examiner—Brian M. Healy

(57) ABSTRACT

An optical sub-assembly (OSA) module for suppressing optical back-reflection and effectively guiding light from a light source to an optical waveguide is disclosed. The module comprises a light source for emitting light to said optical waveguide and at least one light transmitting element installed between said light source and said optical waveguide. The at least one light transmitting element is arranged to have a configuration for avoiding light to reflect back to the light source and to cause a light beam from said light source to point to said core of said optical waveguide. Thereby, the working distance is increased, and the assembling process of the OSA module is simplified. This new optical design scheme will greatly improve the optical characteristics of an OSA module, increase the optical transceiver propagation distance, and reduce the difficulty of OSA assembly process.

19 Claims, 13 Drawing Sheets

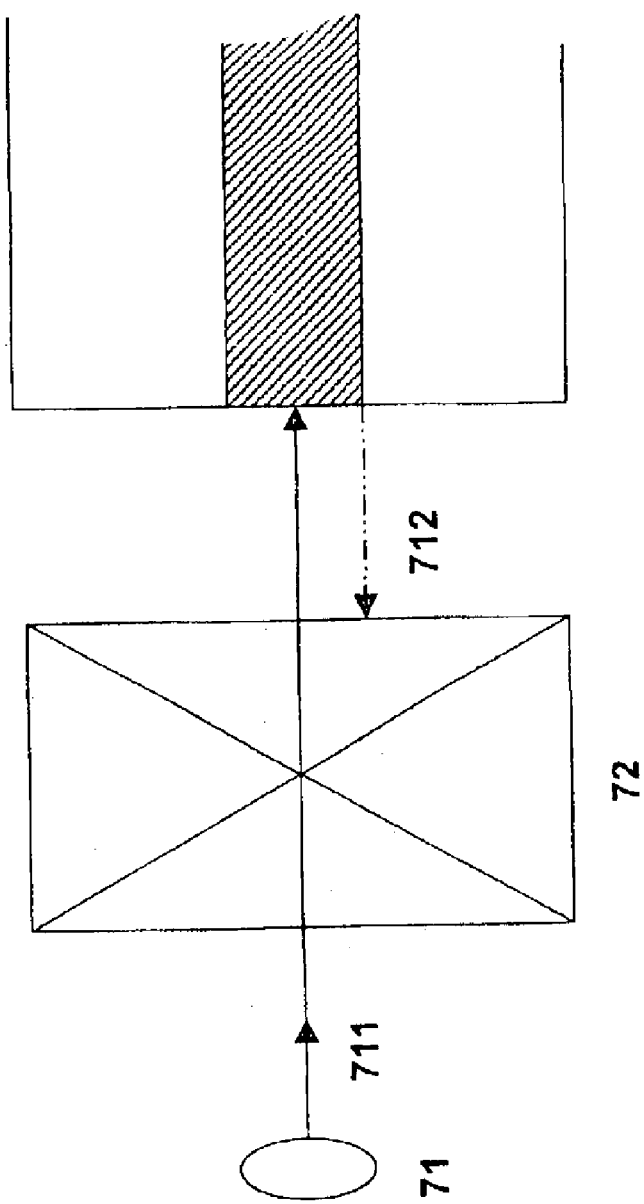

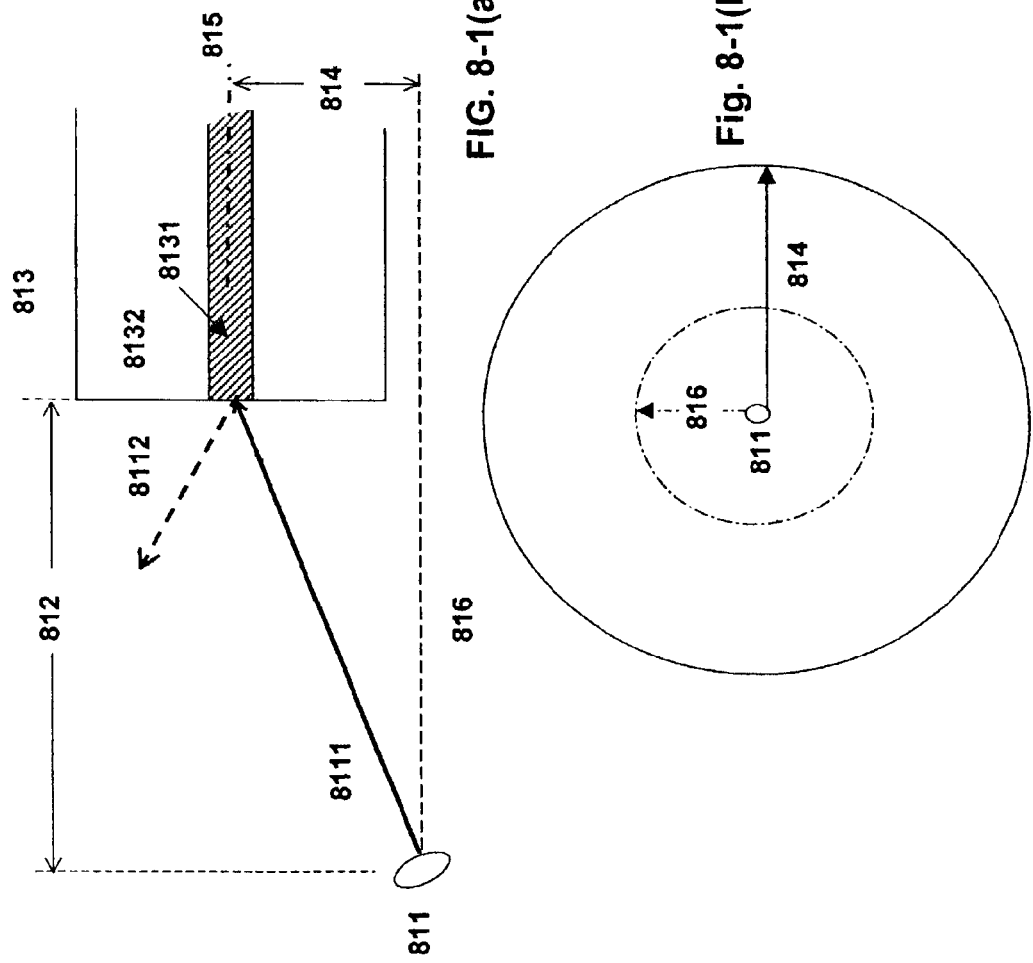

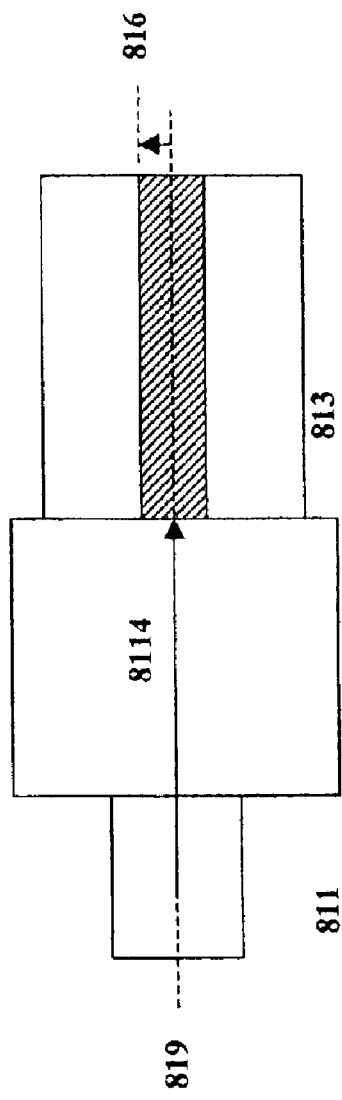
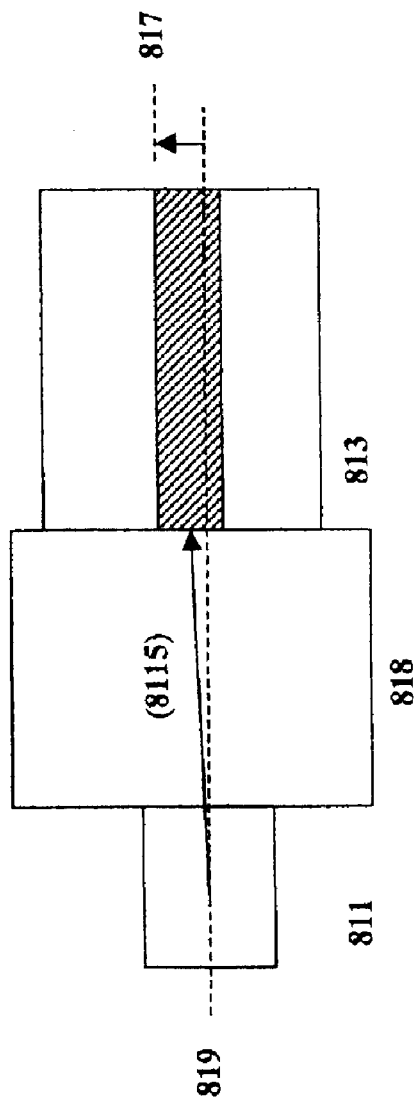
FIG. 8-1(c)
FIG. 8-1(d)

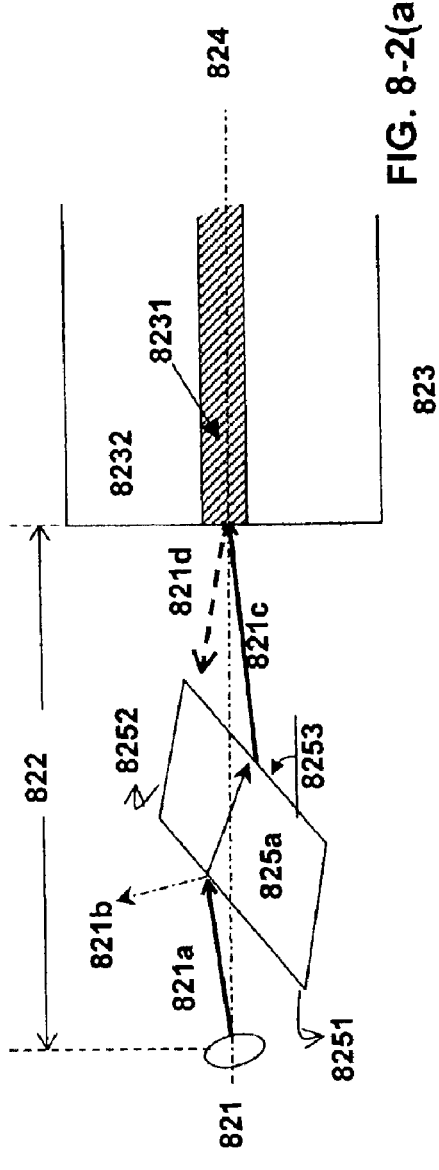
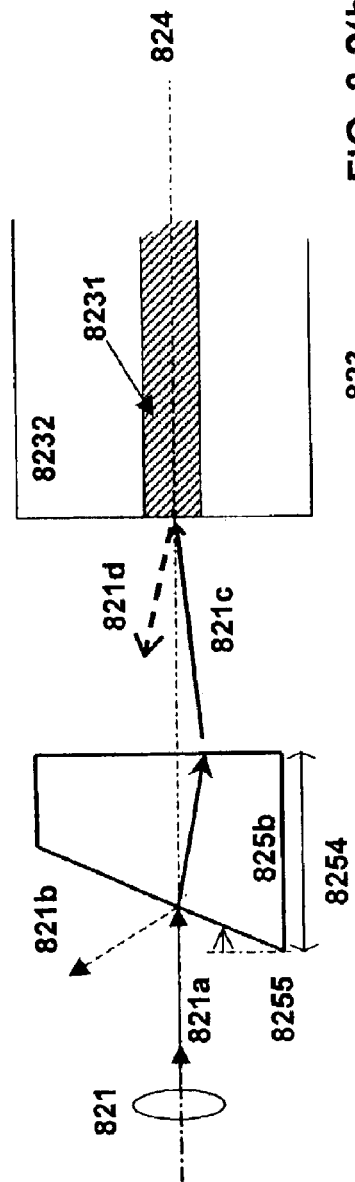
FIG. 8-2(a)
FIG. 8-2(b)

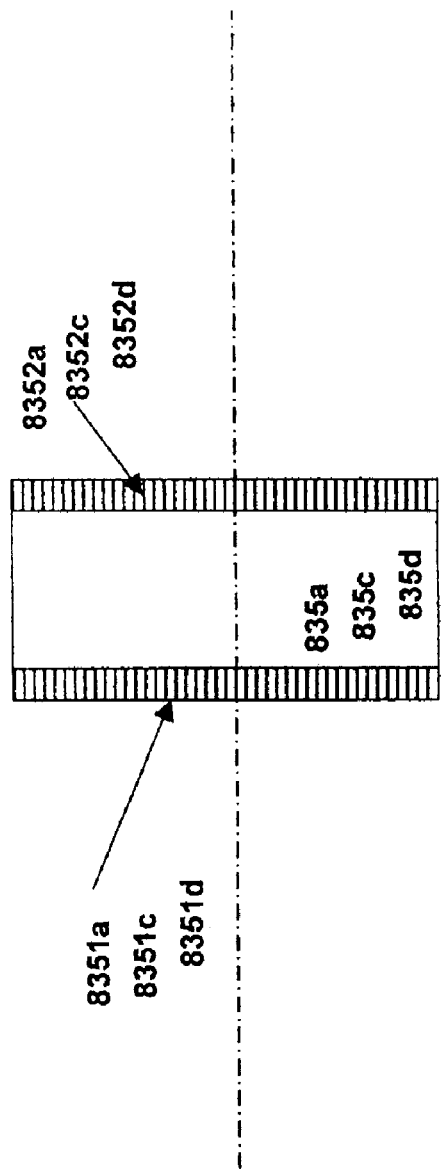
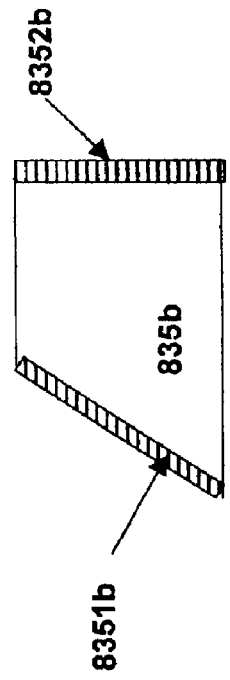
FIG. 8-3(b)
FIG. 8-3(a)

US 6,945,710 B2

OPTICAL SUB-ASSEMBLY MODULE FOR SUPPRESSING OPTICAL BACK-REFLECTION AND EFFECTIVELY GUIDING LIGHT FROM LIGHT SOURCE TO OPTICAL WAVEGUIDE

FIELD OF THE INVENTION

The present invention related to optical subassembly modules used in optical testing, package and design, and particularly to an optical sub-assembly (OSA) module for suppressing optical back-reflection and effectively guiding light from a light source to an optical waveguide, in that at least one light transmitting element installed between the light source and the optical waveguide. The at least one light transmitting element is arranged to have a configuration for avoiding light to reflect back to the light source and to cause a light beam from the light source to point to the core of the optical waveguide.

BACKGROUND OF THE INVENTION

Optical sub-assembly modules are used in many fields for signal conversion between optical signals and electric signals. One of the applications of optical sub-assembly module is optical transceiver which are important in optical communication. The optical transceiver serves to transfer speech or data signals from electric signals to optical signals so as to be transferred in single mode or multi-mode optical fibers to a far end. Then the optical signals are converted back to electric signals to complete a long distance transmission. One of the optical sub-assembly module frequently used is to guide light beam from a light source to an optical waveguide, such as optical fibers.

Referring to FIG. 1, a prior art coupling structure of a light source and an optical waveguide is illustrated. The prior art structure is formed by a light source 11, an optical coupling module 12, and an optical waveguide 13. The light beam from the light source 11 and then are collected by the optical coupling module 12 to be converted into a field pattern similar to that of the optical waveguide. Then the light beam is transmitted to an end face of the optical waveguide 13 to be coupled to the core of the optical waveguide 13 so that optical signals are transferred in the optical waveguide 13.

Semiconductor lasers and light emitting diodes are currently used light source 11. The optical waveguide 13 may be optical fibers or plane type integrated optic waveguide. The optical coupling module 12 may be one of a spherical lens or a aspherical lens, or a GRIN (GRadient INdex) lens, or cylindrical lens, or the combination of above components. Since above optical coupling module 12 has a bulky volume, it is not preferred for the current trend of slicing electro-optical modules. Moreover, to assemble these three optical components (light source 11, optical coupling module 12 and optical waveguide 13) will greatly increase the cost and the difficulty in package. For example, FIG. 2 shows one example of the prior art design, wherein the optical sub-assembly module includes an optical waveguide 20, a light source 21, a lens 22, a core 23, and a cladding 24. Indication 25 is a distance between the light source and the optical waveguide. In another improvement, the lens 22 is directly combined with the optical waveguide 20 so as to reduce the volume thereof.

With reference to FIG. 3, pluralities of current used structures are illustrated. Wherein in FIGS. 3b, 3c and 3d, the optical coupling modules are directly formed on the optical fibers instead of using another optical element. These designs are economical. For those illustrated in FIGS. 3a, 3e, and 3f, extra optical elements are used. No matter what methods are used, the working distance (numeral 25 in FIG. 2) is short, typically about 10 µm. Thus, it is difficult to assemble these elements. Too small working distance causes a larger reflection from the end face of the lens. As a consequence the light source is unstable.

To increasing the working distance and reduce back-reflecting light, as shown in FIG. 4-1, an optical sub-assembly module is illustrated. It contains a light source 41. The optical waveguide 43 has a core 44 and a cladding 45. The indication 46 shows the working distance between the optical waveguide 43 and light source 41. The indication 42 is a divergent angle of the light beam emitted from the light source 11. In FIG. 4-1, it is illustrated that a larger optical waveguide 43 is added before the core. The core diameter of the optical waveguide 43 has a diameter 431 larger than that of the core 44. FIG. 4-2 shows a further improvement from that shown in FIG. 4-1. In FIG. 4-2, the optical waveguide 43 is formed by high temperature thermal diffusion. The defect of this prior art is that the manufacturing time (about 1 to 2 hours) is too long to be economic. The manufacturing period is determined based on the property of fiber.

To further suppress optical back-reflection and guide light from a light source to an optical waveguide, some efforts are made in the past. Referring to FIG. 5, it is illustrated, that light beam 511 from the light source 51 is propagated through a distance 52 to an end surface 53 of the fiber. Since the end surface effect, incident light beam 511 will reflect as a reflecting light beam 512 as it incidents into the end surface 53. However, this will induce the mode hoping of the light source 51 so that the output power is unstable and thus the transmission property of the optical transceiver is affected.

To further resolve above-mentioned problem, in the prior art, some ways are used to suppress optical back-reflection and guide light from a light source to an optical waveguide. In the first method, as shown in FIG. 6, the incident light beam 611 is from a light source 61 to a optical fiber 63 having a core 631 and a cladding 632. An incident light beam 611 and a reflecting light beam 612 propagates along different paths and thus no interference to the semiconductor laser light source 61 and no interference to the transmission capability of the optical transceiver.

Referring to FIG. 7, the incident light 711 is incident into a light source 71, and an optical coupling module is added with an isolator 72 for isolating the back-reflection light 712.

Referring to FIG. 8-1(a), it illustrates a light source 811, an incident light beam 8111, a reflecting light beam 8112, a working distance 812, and an optical waveguide 813 having a core 8131 and an cladding 8132. The indication 814 is a shift and mechanic center of the optical waveguide is indicated by 815. In this prior art, the light source is inclined.

The prior arts illustrated in FIGS. 6 and 7 need high costs and complicated manufacturing process. The prior art illustrated in FIG. 8 will cause that the incident light has a greatly shift 814 from the original mechanical central shaft 815. Due to the mechanic confinement and the problem of concentricity it can be not successfully assembled to an optical transceiver module. Moreover, the shift 814 will increase the coupling time in the packaging process of the optical sub-assembly module. It should be known from those illustrated in FIGS. 8-1(b), 8-1(c) and 8-1(d), in these drawings, the components are a light source 811, an incident light beams 8114, 8115, an optical waveguide 813, searching ranges 816 and 817, optical coupling module 818 and mechanic center axis 819. In FIGS. 8-1(*b*) and 8-1(*c*), if no shift occurs, it is only necessary to search a small circle 816, while in 8-1(*b*) and 8-1(*d*), it is appreciated that under the consideration of shift, the search area is the larger circle 817 (in that the shift 814 is approximately equal to the large searching area 817). Thereby, the manufacturing time period is long.

SUMMARY OF THE INVENTION

Accordingly, the primary object of the present invention is to provide an optical sub-assembly module for suppressing optical back-reflection and effectively guiding light from a light source to an optical waveguide having a core. The optical sub-assembly module comprises a light source for emitting light to the optical waveguide; at least one light transmitting element installed between the light source and the optical waveguide. The at least one light transmitting element is arranged to have a configuration for avoiding light to reflect back to the light source and to cause a light beam from the light source to point to the core of the optical waveguide.

Another object of the present invention is to provide an optical sub-assembly module for suppressing optical back-reflection and effectively guiding light from a light source to an optical waveguide, wherein the working distance is increased, and the assembling process of the OSA module is simplified. This new optical design scheme will greatly improve the optical characteristics of an OSA module, increase the optical transceiver propagation distance, reduce the difficulty of OSA assembly process, increase the yield and reduce the cost of OSA module production.

The various objects and advantages of the present invention will be more readily understood from the following detailed description when read in conjunction with the appended drawings.

BRIEF DESCRIPTION OF THE DRAWINGS

FIGS. 3*b*, 3*c* and 3*d* are based on the prior art design, and in FIGS. 3*a*, 3*e* and 3*f*, extra optical elements are added before original optical waveguides.

FIG. 4-1 is a basic form of this structure and FIG. 4-2 shows an enlarger optical waveguide structure by thermal diffusion.

FIG. 7 shows a prior art for avoiding the back-reflection light, which is used by an optical isolator.

FIG. 8-1(*a*) is a schematic view showing that the oblique light is used to avoid the back reflecting light according to prior art technology.

FIG. 8-1(*b*) is a schematic view showing that the searching regions of the light source and optical coupling module when the light source is inclined and not inclined according to prior art technology.

FIG. 8-1(*c*) is a schematic view showing the relations between the light source, optical coupling module, optical waveguide, mechanical center axis, and searching area when the light source is not inclined.

FIG. 8-1(*d*) is a schematic view showing the relations between the light source, optical coupling module, optical waveguide, mechanical center axis, and searching area when the light source is inclined.

FIG. 8-2 shows of the optical sub-assembly module for suppressing optical back-reflection and effectively guiding light from a light source to an optical waveguide according to the present invention.

FIG. 8-2(*a*) shows one embodiment of the present invention, where a flat plate lens is used for guiding light from the light source.

FIG. 8-2(*b*) shows one embodiment of the present invention, where a prism is used for guiding light from the light source.

FIG. 8-2(*c*) shows one embodiment of the present invention, where two flat plate lens are used.

FIG. 8-3 shows that anti-reflecting films are used from reducing the reflecting light toward the light source, where in FIG. 8-3(*a*), an embodiment of flat plate lens is illustrated, and in FIG. 8-3(*b*), an embodiment of prism is illustrated.

BRIEF DESCRIPTION OF THE PREFERRED EMBODIMENTS

The present invention will be described hereinafter. The following description is only used to make those skilled in the art understand the present invention, while not to confine the scope of the present invention. For example, the lens used in the following embodiment serves to indicate a light transmitting element and thus it is not limited to the scopes and shapes illustrated in the following description. It should be noted that all the lens stated in this specification are some kinds of light transmitting elements.

Figure 1:
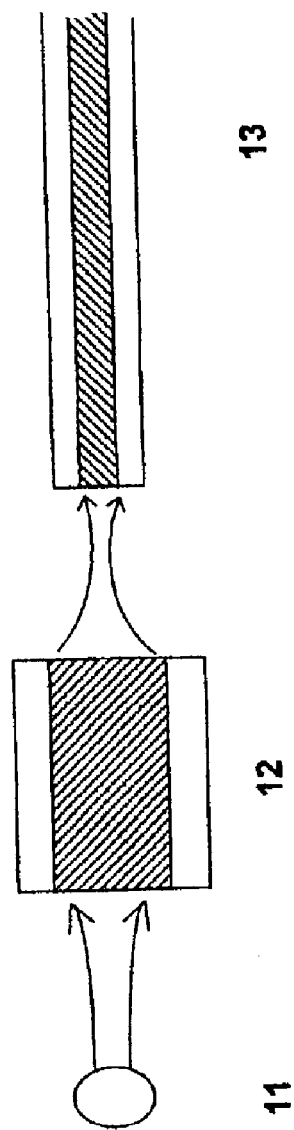
FIG. 1 shows the coupling structure of a light source and an optical waveguide of a prior art design.
Figure 2:
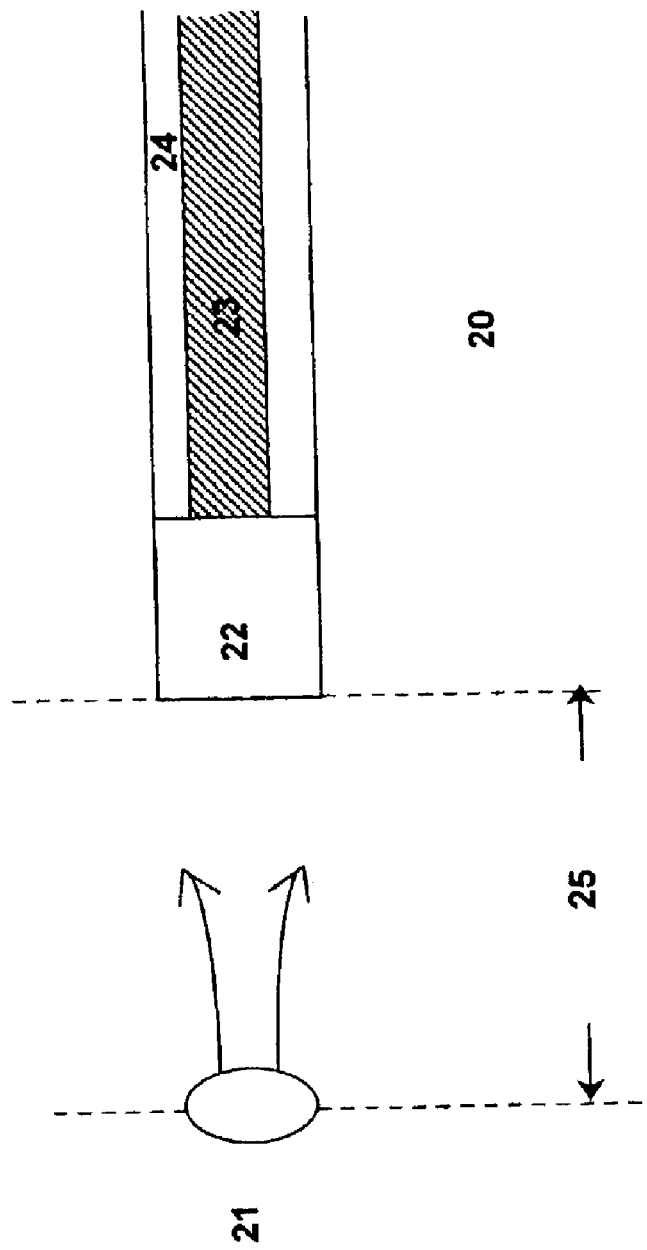
FIGS. 2 show a basic structure of another prior art optical coupling element with a small volume element.
Figures 2C, 8:
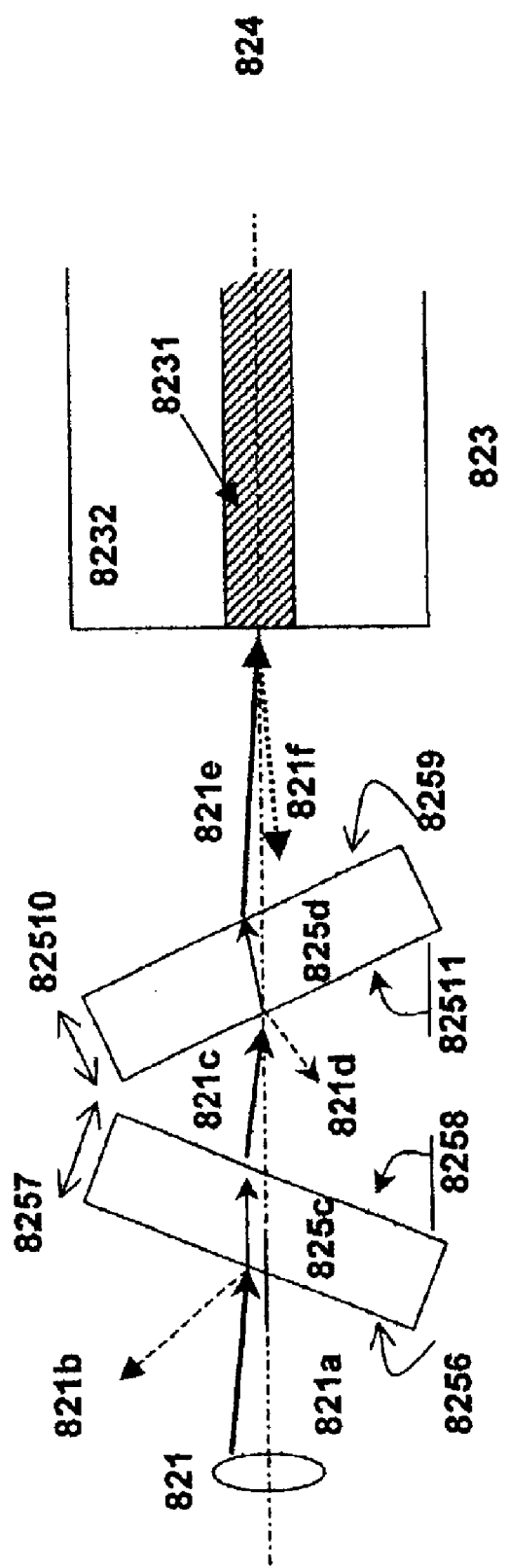

With reference to FIG. 8-2(*a*), the structure of the present invention is illustrated. In the present invention, the optical sub-assembly module includes a semiconductor laser light source 812, a flat plate lens 825*a*, and an optical waveguide 823. The mechanical center axis of the optical waveguide 823 is indicated by numeral 824. The optical waveguide 823 is formed by an core 8231 and a cladding 8232. The refraction index of the flat plate lens 825*a* is n and has an inclined angle θ (indicated as 8253) in the drawings. A length of the lens is L (8251 in the drawing) and a thickness thereof is T (8252 in the drawing). The angle θ is ranged from 0 to 90 degrees. The thickness L of the lens is between 0.1 cm to several tens centimeters. These parameters are determined by the divergent angle of the light source 821. The coarseness and parallelism of the flat plate lens 825*a* are controlled by mechanical polishing and precised grinding. However, these are well known in the prior art and thus the details thereof will not be further described here.

It should be noted that the light source 821 is preferably a semiconductor laser. A special case of the optical waveguide 823 is a fiber. These are general used cases in current electro-optical devices. Moreover, the light source may be a chip-on-substrate type or a TO (Transmission Optics) CAN type light source and the lenses is placed in an optical coupling element which is made of metals or plastics or ceramics or combination of them.

In use, the lens is placed in a coupling element (not shown) and the light source is placed in a case (not shown) or bonded on a submount (not shown). In manufacturing, the optical waveguide must be adjusted for better receiving the light from the light source through the lens.

The shift between the center axes of the optical waveguide 823 and the light source 821 are determined by the refraction index n and the inclined angle θ. Well-arranged refraction index and inclined angle of the lens causes a better concentricity between the optical waveguide 823 and the light source 821.

The principle for arranging the light source and optical waveguide in the present invention will be described herein with reference to FIG. 8-2(a). The light beam 821a emitted from the light source 821 is propagated in the free space through a predetermined distance to an end surface of the flat plate lens 825a. From Snell's Law, some part of the incident light beam 821a is reflected, and some part is transmitted into the flat plate lens with a refracted angle determined by the inclined angle θ and the refraction index n. Since the incident light is obliquely incident into the flat plate lens 825a, the reflected light 821b will not propagate along the incident path, but has a shift from the incident path and thus no reflected light back from the incident surface of the flat plate lens 825a will return to the light source. The light beam 821a transmits through the flat plate lens 825a as a light beam 821c. The light beam 821c propagates to the optical waveguide 823. A well adjustment of the flat plate lens 825a will cause the light beam 821c to incident toward a center of the optical waveguide 823 with an inclined angle. Likewise, part of the light beam 821c is reflected back and some part of light incidents into the optical waveguide 823. Since two sides of the flat plate lens 825a are parallel, light beam 821c is parallel to the light beam 821a. Thereby, the reflected light 821d from the light beam 821c will not propagate back to the light source 821. Apparently, by placing the flat plate lens 825a between the light source 821 and the optical waveguide 823, the problems of reflection and concentricity are resolved.

Further, referring to FIG. 8-2(b), another embodiment of the present invention is illustrated. In this embodiment, the same elements like those in FIG. 8-2(a) are indicated with the same numerals and thus the details will not be further described herein, which can refer to the description about FIG. 8-2(a). The difference of this embodiment from the previous one is that the flat plate lens 825a is replaced by a prism 825b with a thickness 8254 and a prism cutting angle 8255. In this embodiment, the light source 821 incidents the prism 825b straightly, namely, it propagates directly toward the center of the optical waveguide 823.

In this embodiment, the refraction index of the flat plate lens 825a is n' and has an inclined angle θ' (indicated as 8255) in the drawings. A thickness thereof is T' (8254 in the drawing). The angle θ' is ranged from 0 to 90 degrees. The thickness of T' is between 0.1 cm to several tens centimeters. These are determined by the divergent angle of the light source 821. The coarseness and parallelism of the prism 825b are controlled by mechanic polish and precise grind. However, these are well known in the prior art and thus the details thereof will not be further described here. It should be noted that the angle θ' determines the back reflection, namely, it determines the optical property of the optical sub-assembly module. Generally speaking, a preferred L-I optical property has a preferred coupling effect.

The principle for arranging the light source and optical waveguide in this embodiment will be described herein with reference to FIG. 8-2(b). The light beam 821a emitted from the light source 821 is propagated in the free space through a predetermined distance to an end surface of the prism 825b. From Snell's Law well known in optics, some part of the incident light beam 821a is reflected, and some part is transmitted into the prism 825b with a refracted angle due to the inclined angle θ'. Since the incident light is obliquely incident into the prism 825b, the reflected light 821b will not propagate along the incident path, but has a shift from the incident path. Thus no reflected light back from the incident surface of the prism 825b will return to the light source. The light beam 821a transmits through the prism 825b as a light beam 821c. The light beam 821c propagates toward the core 8231 of the optical waveguide 823. A well adjustment of the prism 825b will cause the light beam 821c to incident to a center of the optical waveguide 823 with an inclined angle. However, in each manufacturing process, the relation between the light source 821 and the prism 825b is fixed in advance, and thus, it is necessary to further adjust the optical waveguide 823 to aim at the light beam 821c. Likewise, part of the light beam 821c is reflected back and some part of light incidents into the optical waveguide 823. Thereby, the reflected light 821d from the light beam 821c will not propagate back to the light source 821. Apparently, by placing the prism 825b between the light source 821 and the optical waveguide 823, the problems of reflection and concentricity are resolved.

To further reduce the back-reflecting light for improving the light property of the optical sub-assembly module, another embodiment is illustrated in FIG. 8-2(c). Similarly, in this embodiment, the same elements like those in FIG. 8-2(a) are indicated with the same numerals and thus the details will not be further described herein, which can refer to the description about FIG. 8-2(a). The difference of this embodiment from the previous one is that the two flat plate lenses 825c and 825d are used.

In the present invention, the lenses are made by materials that can transmits light having a wavelength between 0.2 μm to 2.0 μm.

The refraction indices of the flat plate lenses 825c and 825d are $n_1$ and $n_2$, respectively. The flat plate lens 825c has inclined angle 8258 and the flat plate lens 825d has an inclined angle 82511. The lengths of the flat plate lenses 825c and 825d are 8256 and 8259, respectively. The thickness thereof are 8257 and 82510, respectively. The inclined angle of the flat plate lens 825c is ranged from 0 to 90 degrees, and the inclined angle of the flat plate lens 825d is ranged from −0 to −90 degrees. The thickness are between 0.1 cm to several tens centimeters. These are determined by the divergent angle of the light source 821. The coarseness and parallelism of the flat plate lens 825c and flat plate lens 825d are controlled by mechanic polish and preciseness of grind. However, these are well known in the prior art and thus the details thereof will not be further described here.

The special feature of this arrangement is that two flat plate lenses are used. The two flat plate lenses are arranged with opposite orientations. That is, as one of the two flat plate lenses is arranged leftwards, another one is arranged rightwards so as to modify the light path to be aimed at the core 8231 of the optical waveguide 823. The effect of this embodiment is that the light source 821 can emit light along a direction directly toward the optical waveguide 823 instead of inclining with an angle as illustrated in FIG. 8-2(a). The light beam 821c out of the flat plate lens 825c is inclined with respect to the optical waveguide 823, but this obliqueness can be modified by the flat plate lens 825d. As a consequence, the output light beam 821e is aimed at the core 8231 of the optical waveguide 823 with a less oblique angle. Furthermore, due to the absorption and refection of $2^{nd}$ flat plate lens 825d, the total back-reflection light intensity reduced further compare with the case in FIG. 8-2(a). These are advantages of this embodiment over that illustrated in FIG. 8-2(a).

However, the number of lenses used in the present invention is not confined. It is only necessary that the orientations of these lenses are arranged to guide the light along a path from the light source to the optical waveguide.

Figure 3:
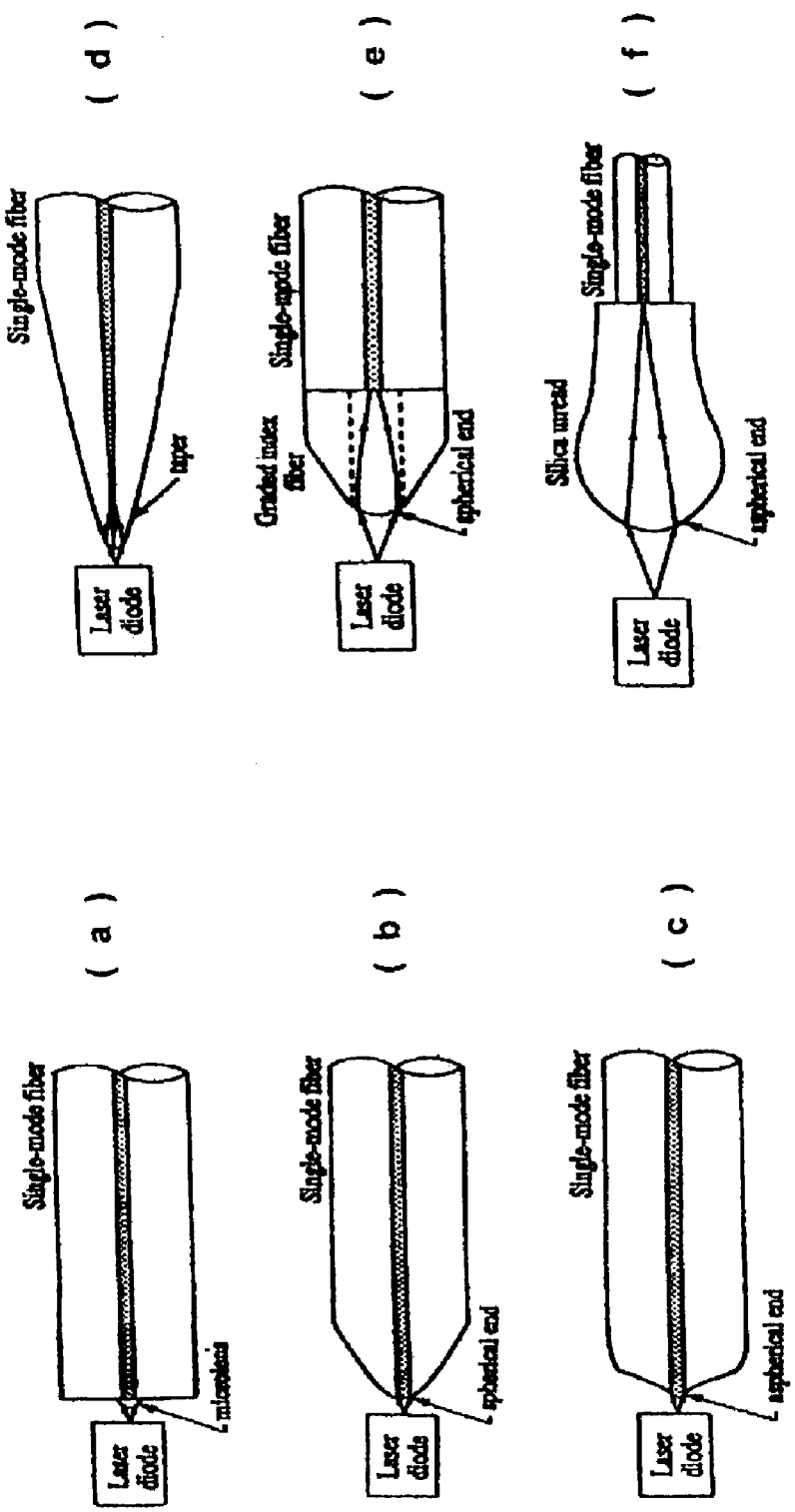
FIG. 3 shows the improvement of the prior art, where
Figures 1, 4:
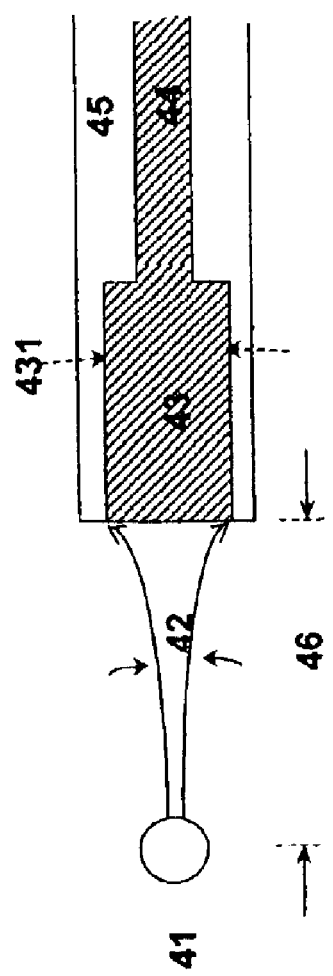
FIG. 4 shows another optical coupling structure with an increasing working distance, where
Figures 2, 4:
Figure 5:
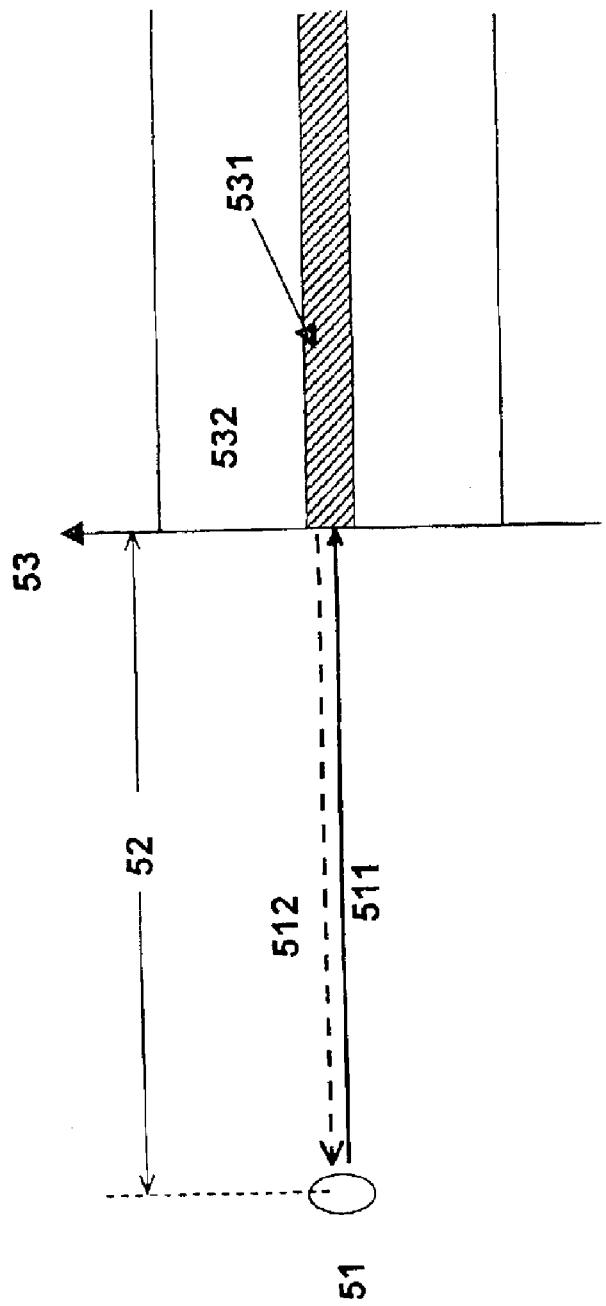
FIG. 5 is a schematic view showing the back-reflection noise affect a semiconductor laser.
Figure 6:
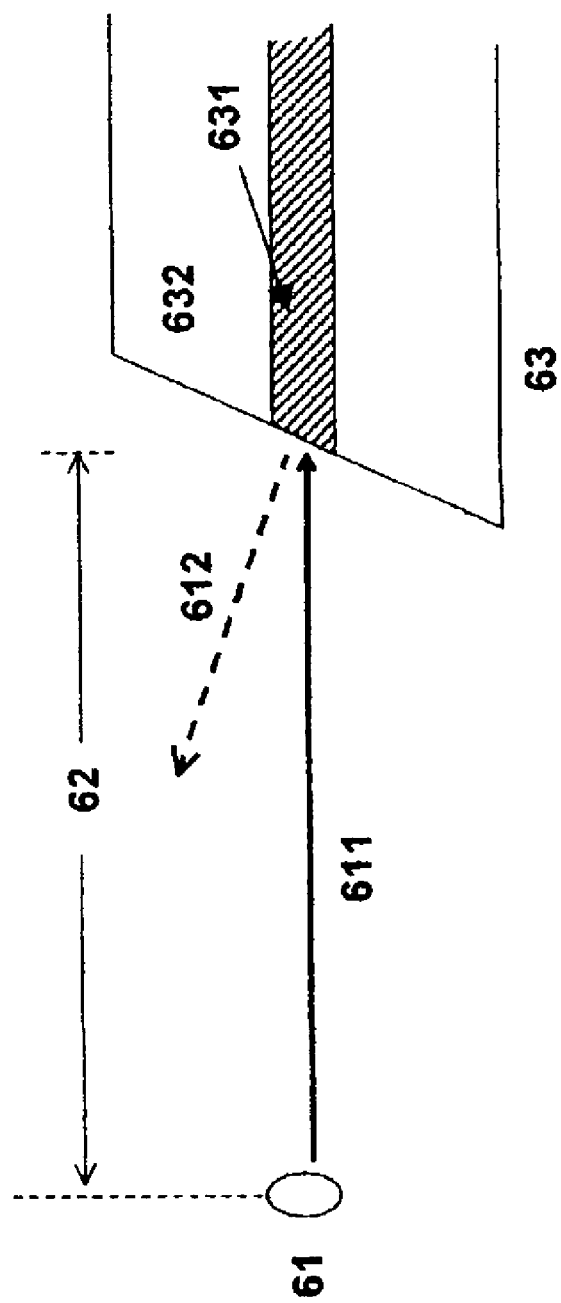
FIG. 6 shows a prior art for avoiding the back-reflection light, which is used by an angle-ended optical fiber.

To further reduce the back reflecting noises from the optical waveguide 823, the lens (such as above mentioned flat plate lenses, 825a~825d, and prism 825b) can be coated with anti-reflecting films at two sides of the lenses. With reference to FIG. 8-3(a), the two sides of the flat plate lens 835 are coated with anti-reflecting films 8351 and 8352. The film 8351 has an effect of eliminate light reflected from a surface of the flat plate lens so that no light (or only a little light) can transmit through this layer to the left side of the flat plate lens. For the film 8352, it will be suppress the reflected light beam from the right surface of flat plate lens. And thus, the light beam reflected from the flat plate lens will not return to the light source 821. This is especially used in an analog optical communication system, such as optical fiber cable TV system, which must have preferred optical characteristics.

A similar example is illustrated in FIG. 8-3(b). In this embodiment, the prism 835(b) is coated with anti-reflecting films 8351 and 8352 at two sides thereof. The physical properties of this configuration are like that illustrated in FIG. 8-3(a). Therefore, the details will not be described further.

To further reduce the back reflecting noises from the optical waveguide 823, the faces of the lens (such as above mentioned flat plate lenses, 825a~825d, and prism 825b) can be curved faces instead of a flat faces.

The package scheme of above-mentioned optical sub-assembly (OSA) module can be a co-axial receptacle type OSA, a pigtailed type OSA, a Butterfly type OSA, or a DIP (Dual In-line Package) type OSA. The form of above-mentioned light source can be either a chip-on-substrate type or a TO CAN type.

Figure 9:
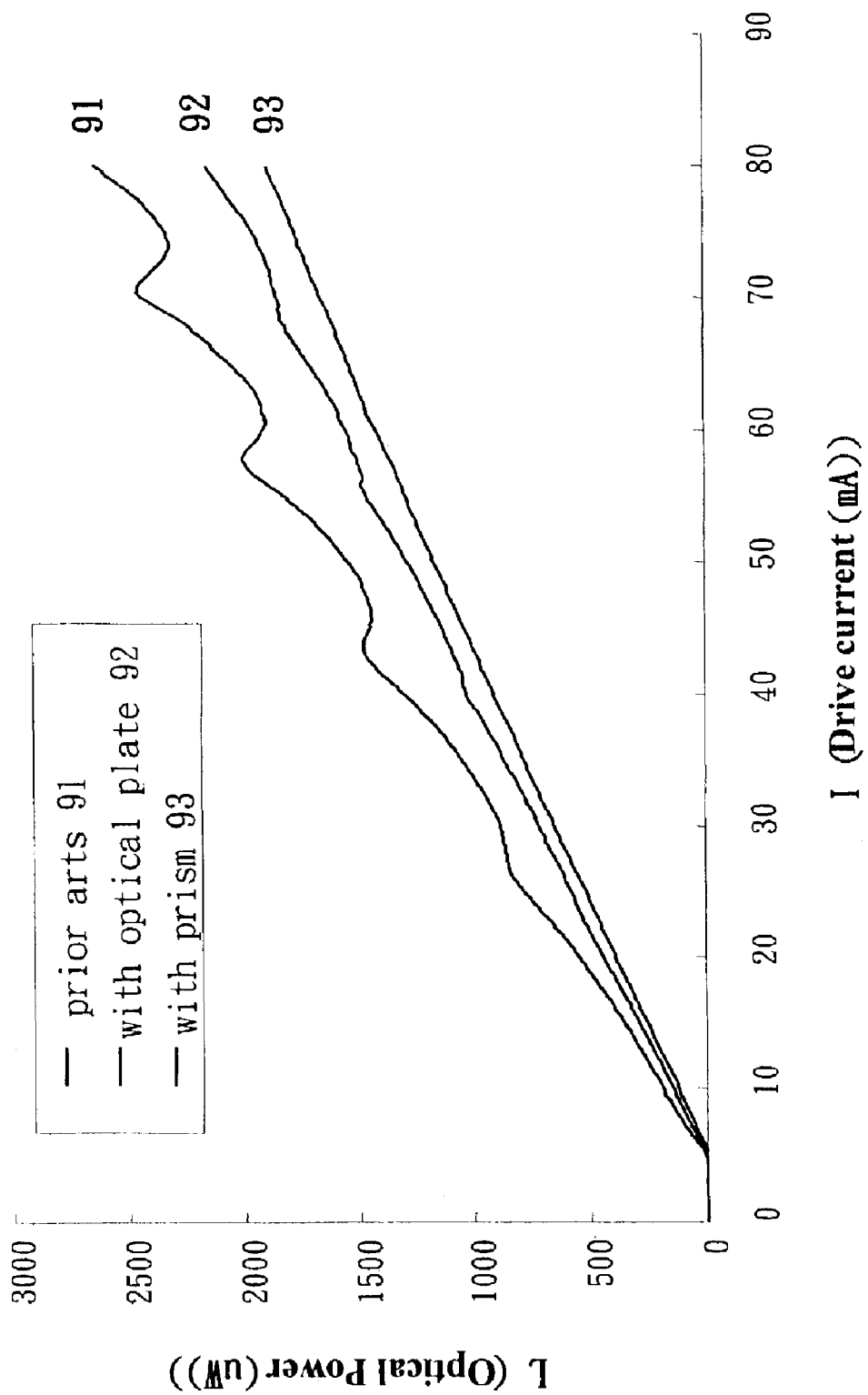
FIG. 9 shows the L-I characteristic curves of the cases according to the present invention and the prior art.

To prove the usefulness of the present invention, the experiment result of the present invention is illustrated in FIG. 9. It is shown that the L-I curve 92 of the flat plate lens and the L-I curve 93 of the prism are better than the L-I curve of the prior art ways 91. In other words, both the flat plate lens and prism can resolve the interference of back reflection effectively so as to have a preferred L-I curve.

The present invention is thus described; it will be obvious that the same may be varied in many ways. For example, the lens can be replaced by any kind of light transmitting element, in fact, lenses are some kinds of light emitting elements. Such variations are not to be regarded as a departure from the spirit and scope of the present invention, and all such modifications as would be obvious to one skilled in the art are intended to be included within the scope of the following claims.

What is claimed is:

1. An optical sub-assembly module for suppressing optical back-reflection and effectively guiding light from a light source to an optical waveguide having a core; comprising:
   a light source for emitting light to said optical waveguide; and
   at least one light transmitting element installed between said light source and said optical waveguide;
   wherein said at least one light transmitting element is arranged to have a configuration for avoiding light to reflect back to the light source and to cause a light beam from said light source to point to said core of said optical waveguide;
   wherein said at least one light transmitting element is placed in an optical coupling element which is made by combination of metals, plastics and ceramics.

2. An optical sub-assembly module for suppressing optical back-reflection and effectively guiding light from a light source to an optical waveguide having a core; comprising:
   a light source for emitting light to said optical waveguide; and
   at least one light transmitting element installed between said light source and said optical waveguide;
   wherein said at least one light transmitting element is arranged to have a configuration for avoiding light to reflect back to the light source and to cause a light beam from said light source to point to said core of said optical waveguide;
   wherein only one light transmitting element is installed between said light source and said optical waveguide;
   wherein two sides of the flat plate lens are coated with anti-reflection films, namely, a first film and a second film; said first film facing to said light source and said second film on an opposite side of said flat plate lens, both of these films have an effect of eliminating light reflected from a surfaces of the flat plate lens so that no light or little light reflected back to the light source.

3. An optical sub-assembly module for suppressing optical back-reflection and effectively guiding light from a light source to an optical waveguide having a core; comprising:
   a light source for emitting light to said optical waveguide; and
   at least one light transmitting element installed between said light source and said optical waveguide;
   wherein said at least one light transmitting element is arranged to have a configuration for avoiding light to reflect back to the light source and to cause a light beam from said light source to point to said core of said optical waveguide;
   wherein said at least one light transmitting element is made by materials that can transmits light having a wavelength between 0.2 $\mu$m to 2.0 $\mu$m.

4. The optical sub-assembly module as claimed in claim 3, wherein said light source is a semiconductor element.

5. The optical sub-assembly module as claimed in claim 4, wherein said semiconductor element is one of semiconductor lasers and light emitting diodes.

6. The optical sub-assembly module as claimed in claim 3, wherein said light source is one of chip-on-substrate type and TO (Transmission Optics) CAN type.

7. The optical sub-assembly module as claimed in claim 3, wherein only one light transmitting element is installed between said light source and said optical waveguide.

8. The optical sub-assembly module as claimed in claim 7, wherein said light transmitting element is a flat plate lens which is obliquely placed between said light source and said optical waveguide.

9. The optical sub-assembly module as claimed in claim 7, wherein said light transmitting element is a prism.

10. The optical sub-assembly module as claimed in claim 3, wherein a plurality of light transmitting elements are placed between said light source and said optical waveguide, and two adjacent light transmitting elements have opposite orientations so as to guide light beam near a straight path from said light source to said optical waveguide.

11. The optical sub-assembly module as claimed in claim 10, wherein at least one of said plurality of light transmitting elements are coated with anti-reflecting film at one side thereof.

12. The optical sub-assembly module as claimed in claim 3, wherein there are two light transmitting elements are placed between said light source and said optical waveguide, and two light transmitting elements have opposite orientations so as to guide light beam near a straight path from said light source to said optical waveguide.

13. The optical sub-assembly module as claimed in claim 12, wherein at least one of said plurality of light transmitting elements are coated with anti-reflecting film at one side thereof.

14. The optical sub-assembly module as claimed in claim 3, wherein said optical waveguide is an optical transmission line.

15. The optical sub-assembly module as claimed in claim 14, wherein said transmission line is one of an optical fiber and an optical integrated plane waveguide.

16. The optical sub-assembly (OSA) module as claimed in claim 3, wherein said OSA module is a co-axial receptacle type OSA.

17. The optical sub-assembly (OSA) module as claimed in claim 3, wherein said OSA module is a pigtailed type OSA.

18. The optical sub-assembly (OSA) module as claimed in claim 3, wherein said OSA module is a Butterfly type OSA.

19. The optical sub-assembly (OSA) module as claimed in claim 3, wherein said OSA module is a DIP (Dual In-line Package) OSA.

* * * * *